US008522200B2

(12) United States Patent
Dunagan et al.

(10) Patent No.: US 8,522,200 B2
(45) Date of Patent: Aug. 27, 2013

(54) DETOURING IN SCRIPTING SYSTEMS

(75) Inventors: John Dunagan, Bellevue, WA (US);
Xiaofeng Fan, Redmond, WA (US);
Jiahe Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1172 days.

(21) Appl. No.: 12/199,813

(22) Filed: Aug. 28, 2008

(65) Prior Publication Data

US 2010/0058293 A1 Mar. 4, 2010

(51) Int. Cl.
*G06F 9/44* (2006.01)
*G06F 3/00* (2006.01)
*G06F 15/177* (2006.01)
*G06F 17/00* (2006.01)

(52) U.S. Cl.
USPC ........... 717/109; 717/108; 717/116; 717/120; 719/318; 719/328; 709/203; 709/219; 709/220; 709/228; 715/205

(58) Field of Classification Search
None
See application file for complete search history.

(56) References Cited

U.S. PATENT DOCUMENTS

| | | | |
|---|---|---|---|
| 6,275,938 B1 | 8/2001 | Bond et al. | |
| 7,117,504 B2 * | 10/2006 | Smith et al. | 719/328 |
| 7,308,648 B1 | 12/2007 | Buchthal et al. | |
| 7,318,238 B2 | 1/2008 | Elvanoglu et al. | |
| 2004/0268139 A1 | 12/2004 | Christianson et al. | |
| 2005/0108517 A1 * | 5/2005 | Dillon et al. | 713/150 |
| 2005/0149726 A1 | 7/2005 | Joshi et al. | |
| 2005/0198332 A1 * | 9/2005 | Laertz et al. | 709/229 |
| 2005/0262181 A1 * | 11/2005 | Schmidt et al. | 709/200 |
| 2005/0262493 A1 * | 11/2005 | Schmidt et al. | 717/164 |
| 2006/0123244 A1 | 6/2006 | Gheorghescu et al. | |
| 2006/0277218 A1 | 12/2006 | Franco et al. | |
| 2007/0016949 A1 | 1/2007 | Dunagen et al. | |
| 2007/0050854 A1 | 3/2007 | Cooperstein et al. | |
| 2007/0107057 A1 | 5/2007 | Chander et al. | |
| 2007/0113282 A1 | 5/2007 | Ross | |
| 2007/0136811 A1 | 6/2007 | Gruzman et al. | |
| 2007/0180147 A1 * | 8/2007 | Leigh | 709/246 |
| 2007/0199000 A1 | 8/2007 | Shekhel et al. | |
| 2007/0204223 A1 * | 8/2007 | Bartels et al. | 715/540 |
| 2007/0256003 A1 * | 11/2007 | Wagoner et al. | 715/501.1 |
| 2007/0282863 A1 * | 12/2007 | Schacher et al. | 707/100 |
| 2007/0299857 A1 | 12/2007 | Gwozdz et al. | |

(Continued)

FOREIGN PATENT DOCUMENTS

WO 2008002456 A2 1/2008

OTHER PUBLICATIONS

Chess, et al., "JavaScript Hijacking", Mar. 12, 2007, pp. 10.

(Continued)

*Primary Examiner* — Isaac Tecklu
(74) *Attorney, Agent, or Firm* — Medley, Behrens & Lewis, LLC (57) ABSTRACT

A system described herein includes a receiver component that receives third party code for execution in a host environment, wherein the third party code corresponds to a dynamic programming language, and wherein the third party code has at least one object reference to a first object that is used by the third party code. A detouring component automatically replaces the first object referenced by the third party code with a proxy object such that the third party code at runtime calls the proxy object instead of the first object.

18 Claims, 11 Drawing Sheets

(56) References Cited

U.S. PATENT DOCUMENTS

| | | |
|---|---|---|
| 2007/0300064 A1 | 12/2007 | Isaacs et al. |
| 2008/0195575 A1* | 8/2008 | Schiffler ........................ 707/1 |
| 2008/0294716 A1* | 11/2008 | Couvreur ..................... 709/203 |
| 2008/0301643 A1* | 12/2008 | Appleton et al. ............ 717/124 |
| 2008/0313648 A1 | 12/2008 | Wang et al. |
| 2009/0006996 A1* | 1/2009 | Saha et al. ................... 715/765 |
| 2009/0183171 A1 | 7/2009 | Isaacs et al. |
| 2009/0183227 A1 | 7/2009 | Isaacs et al. |
| 2009/0187918 A1 | 7/2009 | Chen et al. |
| 2009/0299862 A1 | 12/2009 | Fan et al. |
| 2009/0300496 A1 | 12/2009 | Fan et al. |
| 2009/0327869 A1 | 12/2009 | Fan et al. |

OTHER PUBLICATIONS

Jim, et al., "Defeating Script Injection Attacks with Browser Enforced Embedded Policies", retrieved at<<http://www2007.org/papers/paper595.pdf>>, pp. 601-610.

"Virtual Sandbox 2.0", retrieved at<<http://www.fortresgrand.com/products/vsb/vsb.htm >>, Jan. 25, 2008, pp. 3.

Reis, et al., "Architectural Principles for Safe Web Programs", retrieved at<<http://www-static.cc.gatech.edu/fac/Constantinos.Dovrolis/hotnets07/papers/hotnets6-final68.pdf >>, pp. 7.

* cited by examiner

DETOURING IN SCRIPTING SYSTEMS

BACKGROUND

Online advertising is a multi-billion dollar business. For instance, if a user provides a search query to a search engine, a retailer that offers products or services germane to the search query may wish to advertise to the user, as the advertiser already has an indication of an interest of the user. Online advertising is not limited to search engines, however. For example, a retailer may specialize in offering various brands of electronics devices, and can have a website that can be used in connection with selling electronics. Accordingly, an owner of a particular brand of electronics may wish to advertise to visitors to the website, which generates revenue for the owner of the website.

Frequently, the website host (the content provider) will allow advertisers to have access to all information to be displayed to a user on the web page. In an example, a portion of a website can be dedicated to displaying advertisements, wherein advertising spaces can be auctioned to bidders that will generate a greatest amount of revenue to the content provider. In some situations, however, an advertiser may include code in an advertisement that can cause an entire web page to "break." Furthermore, some web pages are designed to provide data to a user that is personal in nature, such as portions of user emails, local news, and/or the like. It is undesirable to allow access to an advertiser to an entire web page if personal information of users is contained in the web page.

Various solutions exist with respect to this issue. A first requires that an advertiser only provide very simple data to a host to display advertisements, such as a selectable link, making it easy for the host to determine that the advertiser is not viewing any other data on the web page. These advertisements, however, are typically not aesthetically pleasing (e.g., the advertisements cannot include interactive content, cannot dynamically change shape or location, . . . ). Another option is for a host to set up an iframe in an HTML document. An iframe is a window that acts as an entirely separate web page. Iframes, however, are rigid and can negatively impact performance of a browser, and may still be insecure.

SUMMARY

The following is a brief summary of subject matter that is described in greater detail herein. This summary is not intended to be limiting as to the scope of the claims.

Described herein are various technologies pertaining to scripting systems, and more particularly to technologies pertaining to security in scripting systems. A content provider can desirably provide content to one or more users. For instance, the content provider may desirably provide content to one or more users through use of a web page. Furthermore, the content provider may wish to allow third party code to be received and executed within the web page. Pursuant to an example, the content provider may wish to allow an advertiser to display an advertisement on the web page, wherein the advertiser can provide the content provider with payment for allowing the advertisement to be displayed on the web page.

To facilitate securing content shown on the web page (which may be personal in nature to a user), the content provider can use technology described herein as detouring to manage the third party code. In more detail, the third party code may be in a dynamic programming language, such as javascript. The third party code may include a reference to an object or operation that is included in the host environment (e.g., web browser), such as a document object model object or operation reference.

A proxy object can be automatically generated and used as a proxy for the object or operation referenced in the third party code. For instance, the proxy object can be placed in a script execution environment, such that when the third party code requests the object or operation, the third party code will be provided with the proxy object. Accordingly, the content provider can restrict the third party code to particular positions in a web page, can enforce various rules on the third party code, etc., without requiring the advertiser, for instance, to modify the third party code.

Other aspects will be appreciated upon reading and understanding the attached figures and description.

DETAILED DESCRIPTION

Various technologies pertaining to security in scripting systems in general, and security with respect to third party code in web browsers, will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
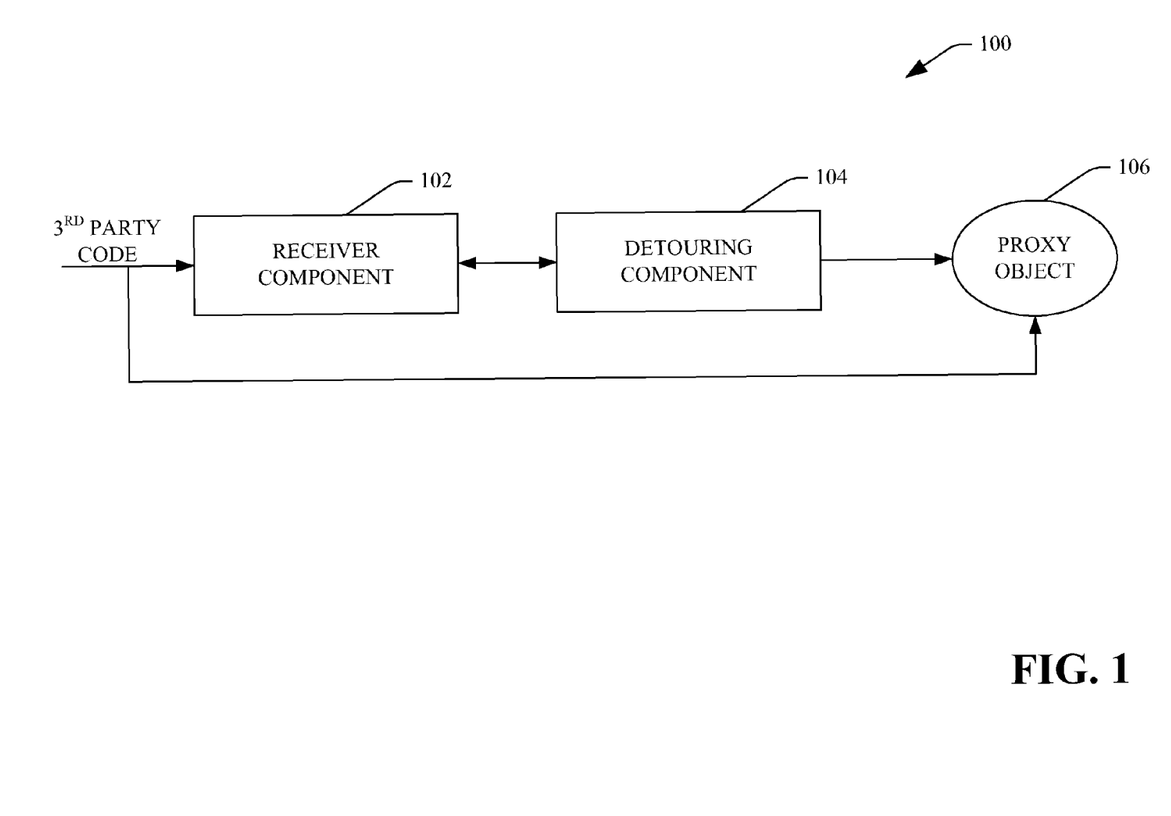
FIG. 1 is a functional block diagram of an example system that facilitates creating a proxy object for use in connection with detouring third party code.

With reference now to FIG. 1, an example system 100 that facilitates securing content of a web page with respect to advertisers is illustrated. The system 100 may be used by a content provider (first party) to display data to a user (second party). The system 100 includes a receiver component 102 that receives third party code (code provided by a third party) for execution in a host environment. In an example, the third party code can correspond to a dynamic programming language, such as javascript, Flash, or other suitable scripting language. The host environment, for example, may be or include a script execution system. In a particular example, the host environment can be or include a web browser. The third party code can include an object reference to a first object that is included in the host environment and is desirably used by the third party code. For instance, the object reference may be a document model object (DOM) reference.

The system 100 can also include a detouring component 104 that creates a proxy object 106. With more particularity, the detouring component 104 can automatically replace a first object and/or operation (not shown) referenced by the third party code with the proxy object 106, such that the third party code at runtime calls the proxy object 106 instead of the first object and/or operation. The detouring component 104, can, for example, replace DOM object references that the third party code desirably uses with a plurality of proxy objects prior to the third party code executing in the host environment (which can be, for instance, a client browser). When the third party code executes in the host environment, the third party code can call into the proxy objects instead of the referenced objects. Accordingly, for instance, the third party code can do no more DOM operations than those allowed by the proxy objects mediating access to the host environment.

In an example utilization of the system, a host web page can include a third party advertisement. If the host web page includes personal information of a viewer of the web page, such personal information may be insecure and accessible by the third party code (advertisement). The detouring component 104 can replace DOM references in the third party code with some proxy objects, thereby ensuring that the advertisement does not act in manners not desired by the host web page. For instance, the detouring component 104 can restrict an advertisement to showing a banner in a particular area. If the advertisement attempts to act in a manner not authorized by the detouring component 104, such as viewing emails, obtaining cookies, etc., the advertisement can effectively be blocked.

The system 100 may be employed in any suitable scripting system, such as in a javascript execution environment. Furthermore, the system 100 may be used in connection with any suitable host environment that wishes to secure third party content that runs together and interacts in client browsers, such as third party gadgets. As will be described in greater detail below, the system 100 can also be used in connection with iframes, including same-domain iframes and soft-cross domain iframes.

Figure 2:
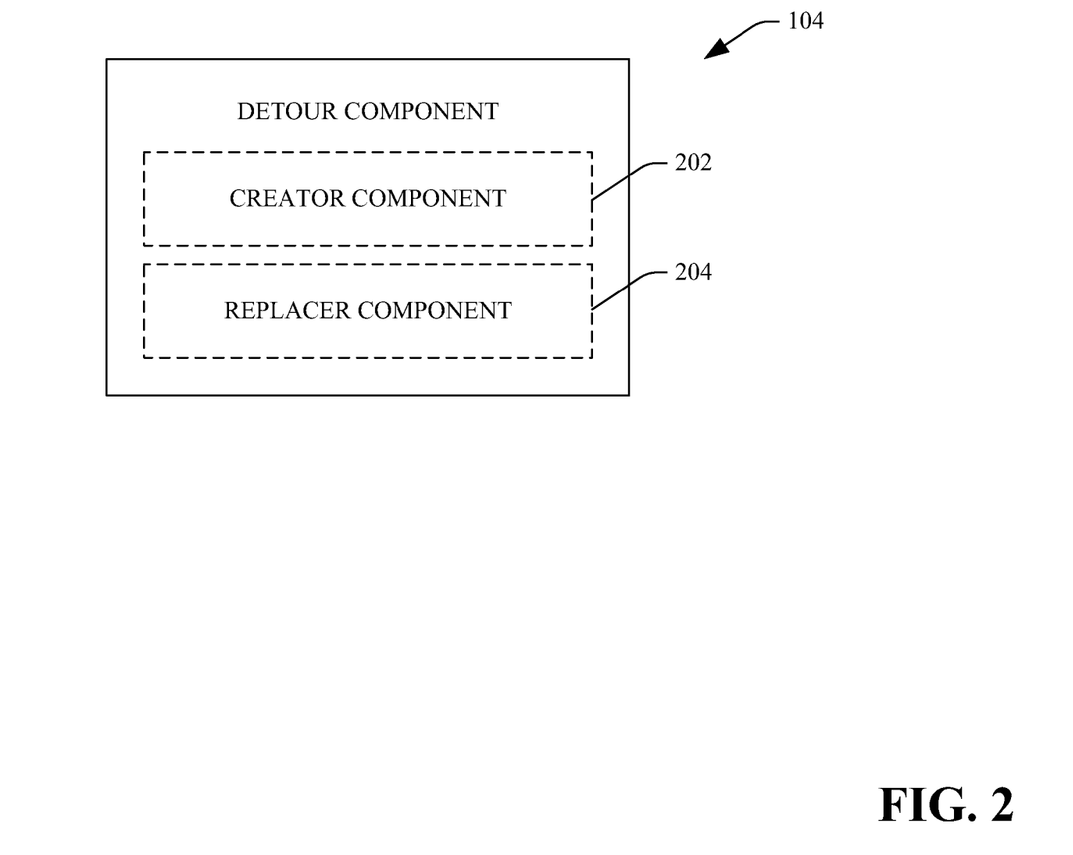
FIG. 2 is an example detouring component.

With reference now to FIG. 2, an example depiction of the detouring component 104 is illustrated. The detouring component 104 can include a creator component 202 that can create a proxy object for the aforementioned first object. In an example, the creator component 202 can create a proxy object of "window" in an iframe in a client browser:

```
var our_window = new function (raw_window) {
    this.alert = function (msg) {if (...) raw_window.alert(msg);};
} (window);
```

The detouring component 104 can also include a replacer component 204 that can replace at least one object reference in third party code with the proxy object created by the creator component 202. In an example, the replacer component 204 can replace an original DOM object reference of "window" in the third party code with the created proxy object:

var window=our_window;

When third party code executes, an operation can be proxied by way of the created proxy object. Pursuant to an example, the third party code can be executed in an iframe, and may include a DOM operation. The DOM operation can be proxied by as follows:

window.alert( . . . );

It can be understood that the detouring component 104 may be well-suited for operation in connection with a javascript execution environment. In an example, the third party code may be javascript that is received in a javascript execution environment, and a javascript interpreter (not shown) may begin executing the received third party code, wherein the code can include a reference to an object "window". Conventionally, the javascript interpreter searches the javascript execution environment for an object "window", and if not found, requests the object from a client web browser (outside the javascript execution environment). The detouring component 104 can generate the proxy object 106 (not shown) inside the javascript execution environment, such that the javascript interpreter locates the proxy object prior to requesting the object from the client browser. Thus, the writer of the third party code need not alter the code to have it execute in the client browser execution environment that has been modified by the detouring component 104. Additionally, names in the third party code will not bind to insecure objects outside of the javascript execution environment, but instead will bind to secure proxy objects created in the javascript execution environment prior to the third party code being executed. Thus, it can be discerned that the detouring component 104 can create a plurality of proxy objects in a script execution environment, wherein the third party code late-binds to such objects in the script execution environment.

Figure 3:
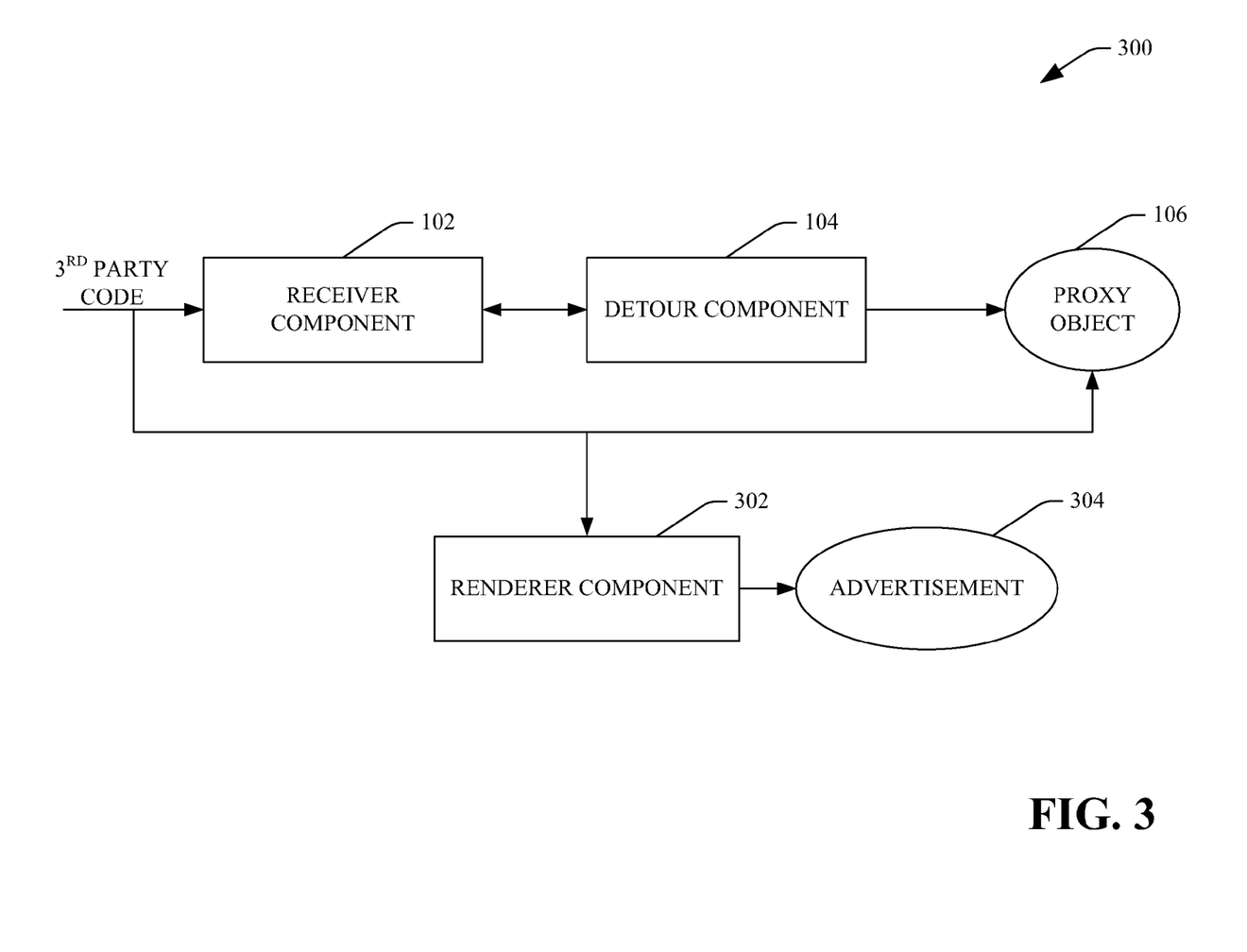
FIG. 3 is a functional block diagram of an example system that facilitates creating a proxy object for use in connection with detouring third party code.

Referring now to FIG. 3, an example system 300 that facilitates displaying an advertisement on a web page is illustrated. The system 300 includes the receiver component 102 and the detouring component 104, which act in conjunction as described above. The system 300 can also include a rendering component 302 that can render an image (e.g., in an advertisement 304) in a web browser based at least in part upon the received third party code. For instance, the third party code may pertain to an interactive advertisement that is configured to change shape, configured to receive change positions (e.g., pull down), etc. The renderer component 302 can render the advertisement 304 in the web browser such that a user (second party) can view the advertisement 304 in an aesthetically pleasing manner.

Figure 4:
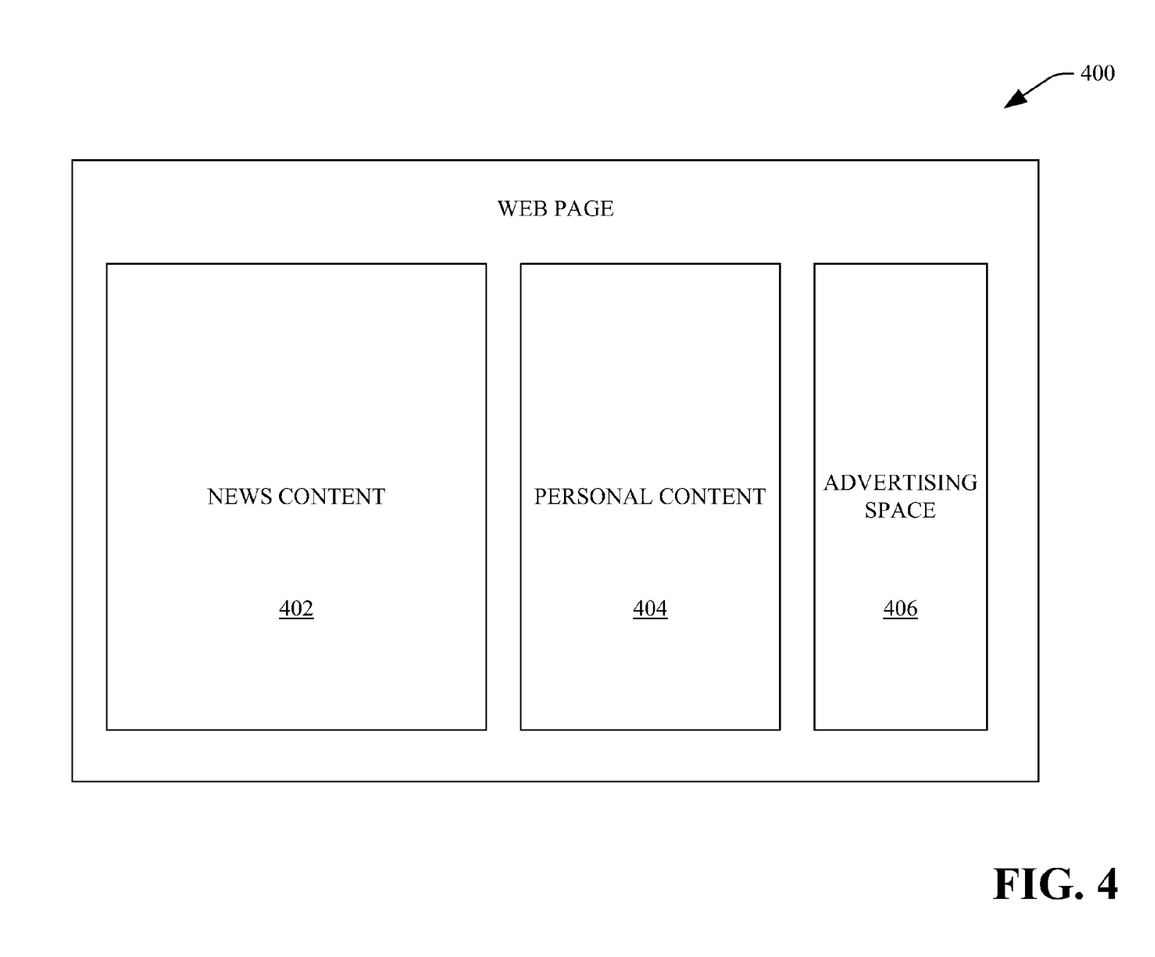
FIG. 4 is an example web page.

Referring now to FIG. 4, an example web page 400 is illustrated. The web page 400 includes a first portion 402 that is configured to depict news items to a user of the web page. The web page 400 also includes a second portion 404 that is configured to display personal information to the user, such as email information, local news items, financial information, and/or the like. The web page 400 also includes a third portion 406 that is configured to display advertisements.

The detouring component 104 (FIG. 1) described above can be used to detour third party code, such as advertising code, such that the third party code is restricted from accessing contents of the second portion 404. In another example, the detouring component 104 can be used to create proxy objects that define particular rules for advertisements displayed in the third portion 406, such as restrictions on an amount of time an advertisement can expand, a restriction on color schemes that can be used in the advertisement, a restriction on an amount of linking text that can be included in an advertisement, amongst other restrictions.

Figure 5:
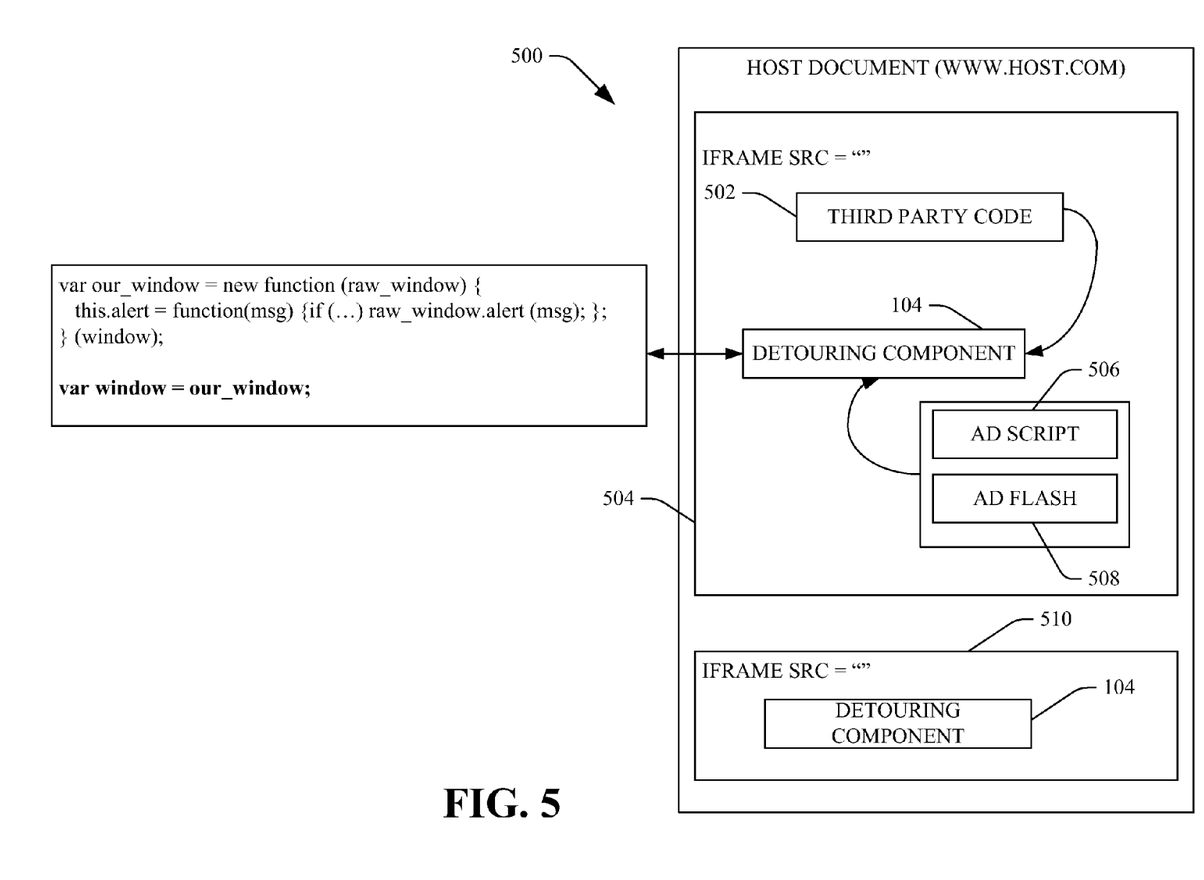
FIG. 5 is an example depiction of a host environment that includes at least one iframe.

Now referring to FIG. 5, an example depiction of a host 500 executing third party code in an iframe is illustrated. The host 500 is configured to restrict third party code 502 to execute in an iframe 504. Security may be sub-optimal, however, as the iframe 504 executes in the host domain due to an empty "src" portion.

In this example, the third party code 502 can include an ad script portion 506 and an ad flash portion 508, wherein flash is content consumed by an Active X control and is another scripting language. The third party code 502 can be injected in the iframe 504 in the host document 500. The detouring component 104 can execute with respect to the third party code 502 and perform the actions described above (e.g., proxy operations at runtime to filter unsafe operations). To undertake such proxying, the detouring component 104 can generate proxy objects for each DOM operation in a DOM tree corresponding to the host 500.

In this example, the host 500 can also include a second iframe 510, wherein the second iframe 510 can be used to allow an advertisement to expand from the iframe 504 into the iframe 510. The detouring component 104 can also execute on code that is desirably injected into the second iframe 510.

As can be discerned, using a same domain iframe can create a same domain namespace that initially is empty—everything in a lookup is directed to a parent namespace. When the detouring component 104 executes, proxy objects can be placed in the same domain namespace. Therefore, each time the ad script portion 506 and the ad flash portion 508 communicate with the detouring component 104, if there is a particular operation they wish to undertake (e.g., on the "window object"), the owner of the host 500 can determine whether the particular operation is allowable. Thus, it can be discerned that the proxy object facilitates executing the third party code in a modified host environment.

Figure 6:
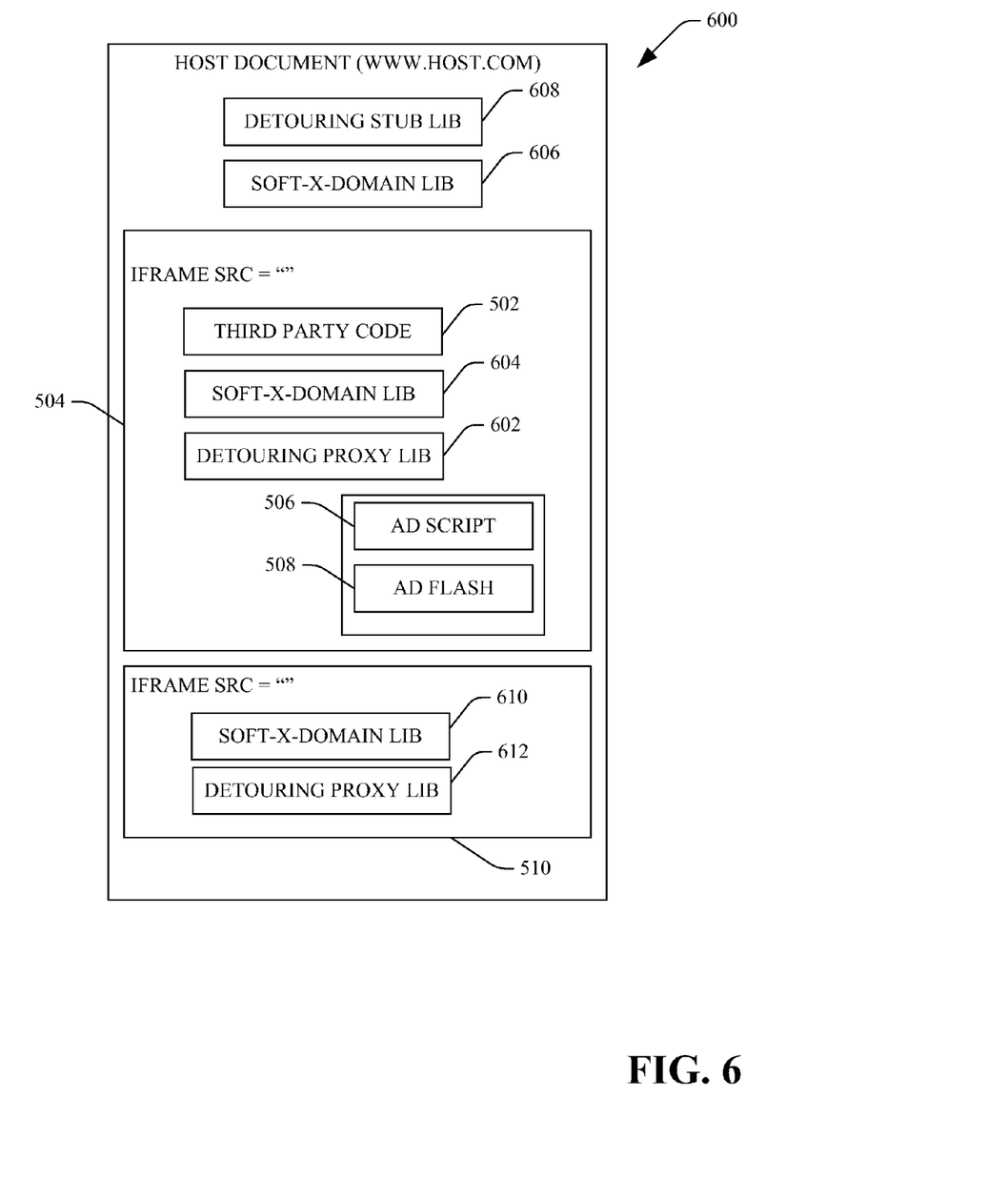
FIG. 6 is an example depiction of a host environment that includes an iframe.

Now referring to FIG. 6, an example host document 600 is illustrated. Additionally, a "document.domain" of an ad iframe can be changed to create a cross-domain iframe 504 (referred to as a soft-cross domain iframe because it started as a same-domain iframe). For instance, the ad iframe may have an original domain identity of www.host.com, which is substantially similar to the domain identity of the host document 600. Accordingly, for example, the following code can be used to change the ad iframe's domain identity:

document.domain="host.com";

A soft cross domain library 604 can be used to provide a text communication channel for an advertisement to communicate with the host 600. To use such channel, however, ad developers would be forced to change code pertaining to the advertisement. The detouring component 104 can be used to facilitate communicating between the advertisement and the host 600 without requiring the advertiser to modify code.

In an example, proxy objects created by the detouring component 104 can translate original direct DOM calls to soft-cross-domain messages. An example is as follows:

```
var parent = new function ( ) {
    this.getDocument = function( ) {
        var proxyId = messenger.send(
            "{parent, get_document, [ ]}") };
        return new Proxy(proxyId);
} ( );
function Proxy(myProxyId) {
    this.createElement = function(tag) {
        var proxyId = messenger.send(
            "{"+myProxyId+", createElement, ["+tag+"]}");
        return new Proxy(proxyId);
    }
};
```

Furthermore, an ad iframe can create a sibling iframe to expand down as follows:

```
var sibling = parent.document.createElement("iframe");
frameElement.parentNode.appendChild(sibling);
```

The host document 600 can load the detouring component 104 to receive and process messages, and all DOM interfaces can be preserved such that ad developers need not alter code pertaining to an advertisement.

More particularly, the iframe 504 can host the third party code 502. When the ad script portion 506 or the ad flash portion 508 generates a DOM operation call, such call can be received at a detouring proxy library 602 (which includes several proxy objects generated by the detouring component 104) and can generate a proxy object request based at least in part upon the DOM operation call. A first soft-cross domain library 604 can receive the proxy object request and can generate a soft cross-domain request in response thereto, wherein the soft cross-domain request may be in the form of a textual message. A second soft-cross domain library 606 that corresponds to the host 600 can receive the soft-cross domain request generated by the first soft-cross domain library 604, and can generate a DOM operation call in response thereto. A detouring stub library 608 can receive the DOM operation call.

Information may then be fed back if desired. For instance, the detouring stub library 608 may output information pertaining to a particular DOM call request The second soft-cross domain library 606 can receive information pertaining to the DOM call request, and can output a textual message. The first soft-cross domain library 604 can receive the textual message and output a proxy object response in response to the textual message. The detouring proxy library 602 can receive the proxy object response and generate a DOM call response based at least in part upon the received proxy object response. Such DOM call response can be transmitted to the ad script 506 or the ad flash 508.

The sibling iframe can also include a soft cross-domain library 610 and a detouring proxy library 612, which can communicate with the host document 600 as described above.

Figure 7:
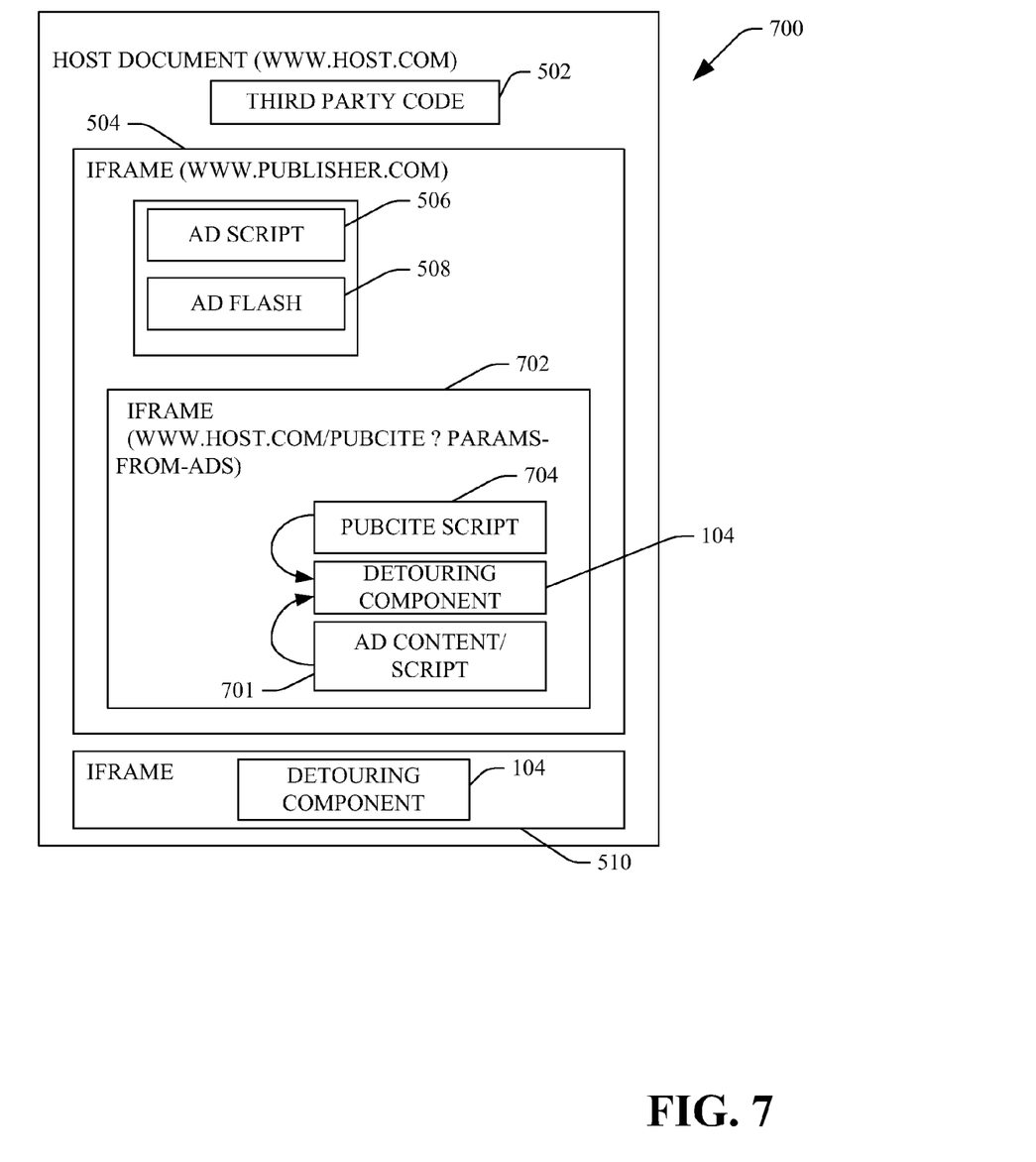
FIG. 7 is an example depiction of a host environment that includes an iframe.

Now referring to FIG. 7, an example depiction of a host 700 is illustrated. This example illustrates loading an advertisement into a cross-domain iframe with an added mechanism, such that a cross-domain iframe can take action on a host web page. More particularly, an ad can be loaded from another domain, and when the advertisements needs the host 700 to undertake a certain action, the advertisement can create a pubsite iframe. In more detail, the advertisement can submit a request for action to the host, and a new iframe can be created and can encode the request to the host 700 by way of a URL. For instance, the host document can be www.host.com, and the URL the ad has created can be www.host.com/pubsite/request-from-ad, wherein "request-from-ad" can be a message that an advertiser desirably transmits to the host. In such a setup, however, there is no security boundary, as the advertisement can undertake any action in the host that is desired.

In this example, an advertisement 701 can be loaded from another domain into the iframe 504. The advertisement, when desiring the host 700 to undertake an action, can create a PubCite iframe 702. PubCite script 704 can be reviewed by the detouring component 104, such that operations requested by the advertisement are proxied at runtime, and unsafe operations can be filtered. In this example, the PubCite file can be modified to include the detouring component 104 or a library of proxy objects.

Figure 8:
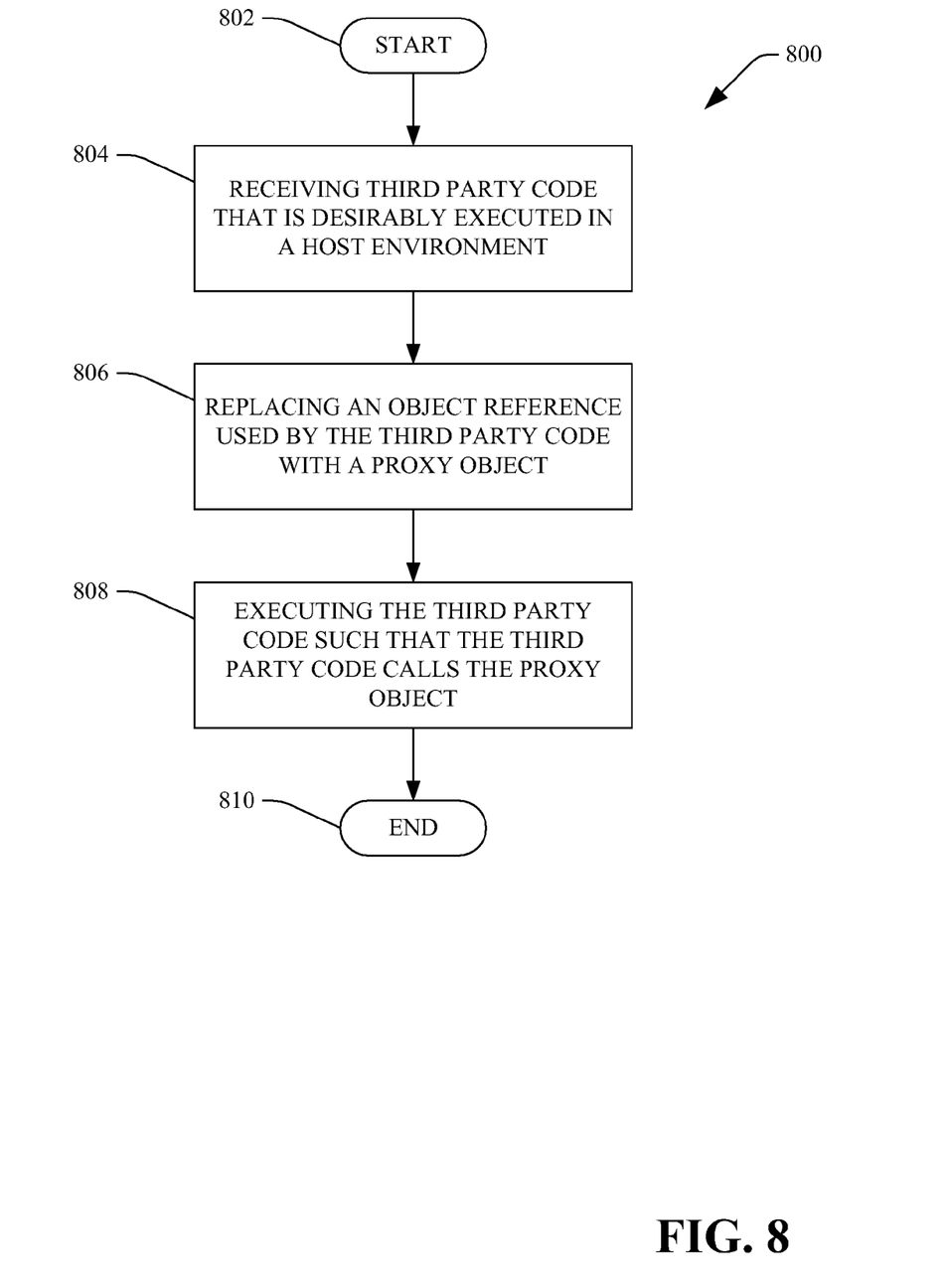
FIG. 8 is a flow diagram that illustrates an example methodology for executing third party code in a host environment.
Figure 9:
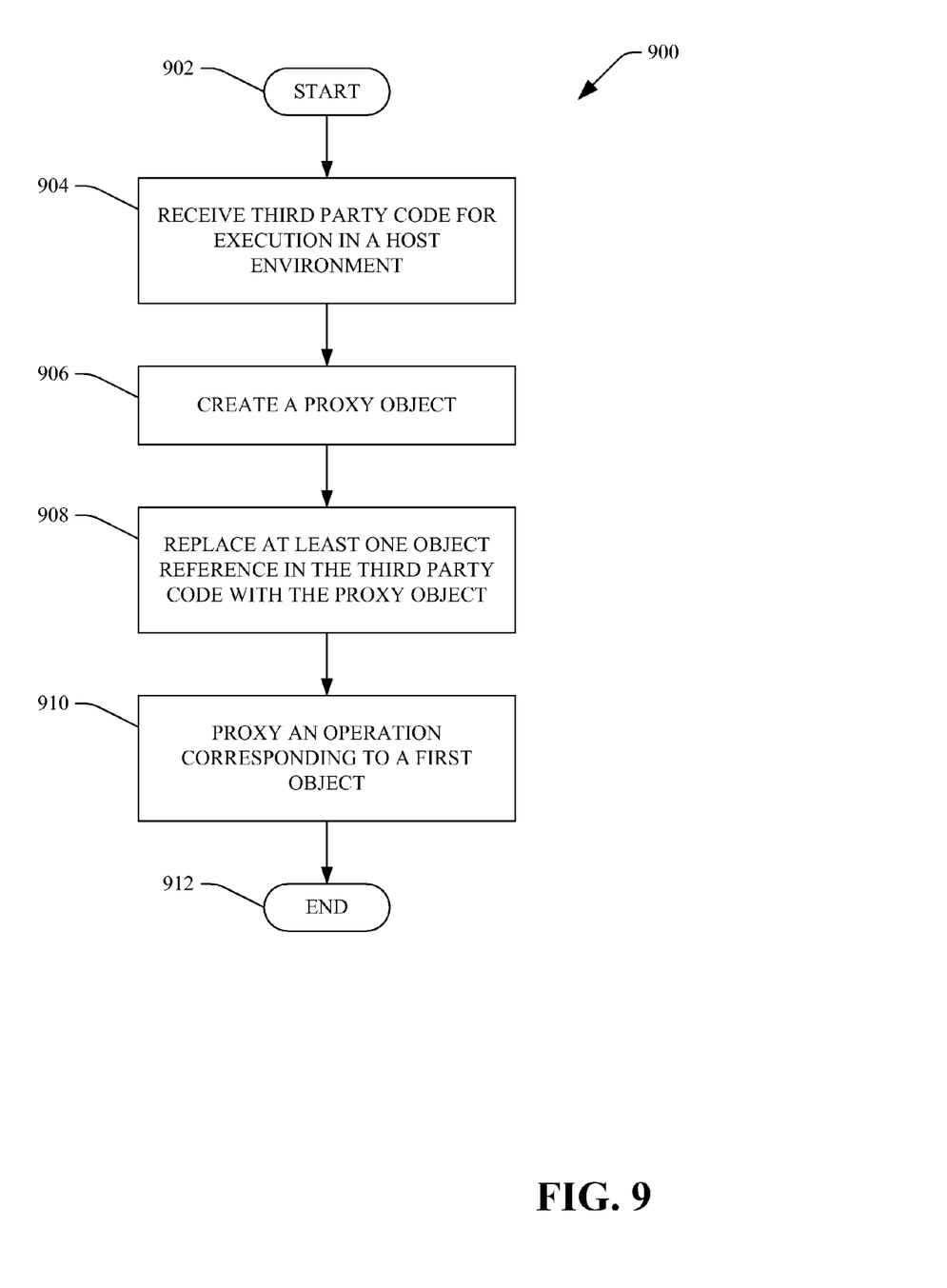
FIG. 9 is a flow diagram that illustrates an example methodology for proxying an operating called by third party code.
Figure 10:
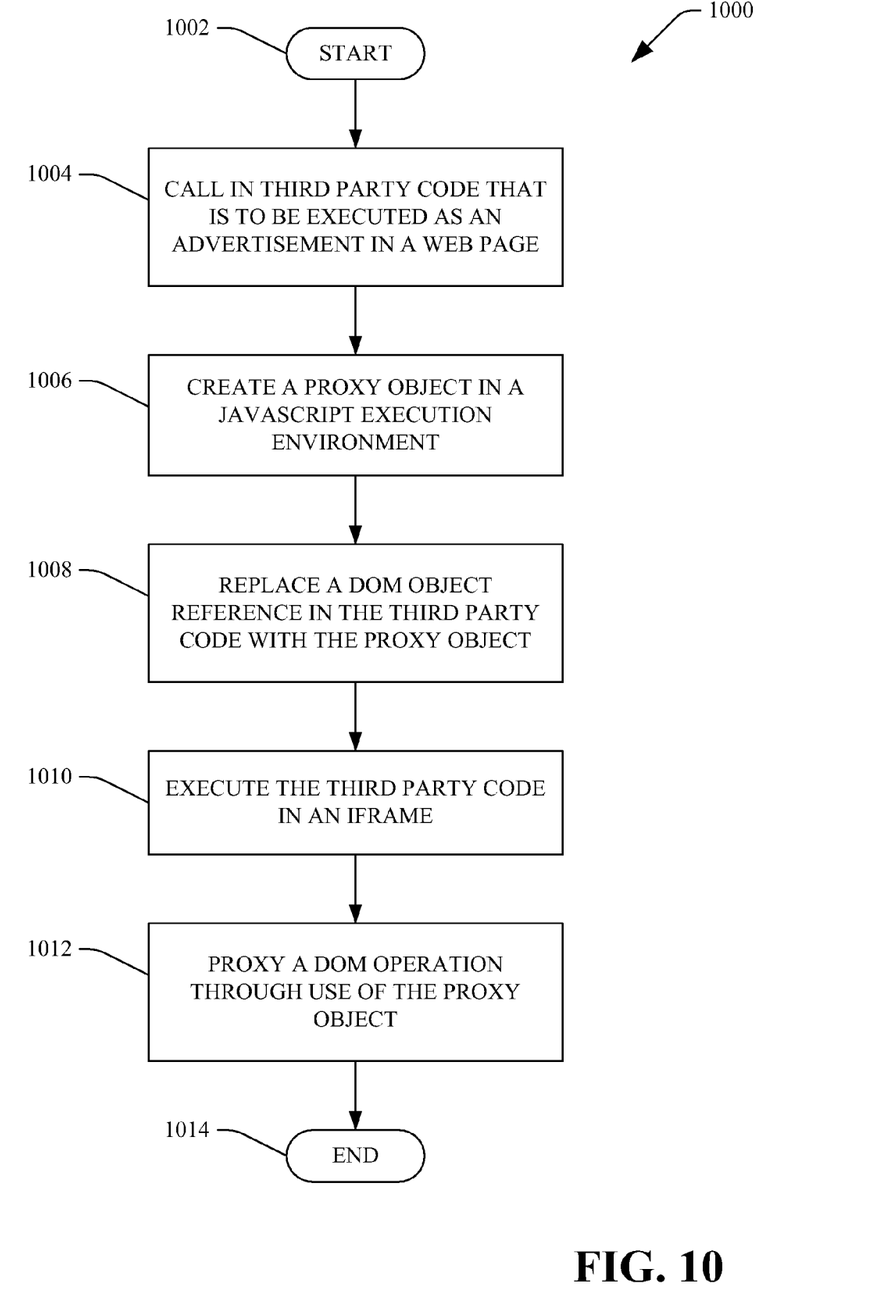
FIG. 10 is a flow diagram that illustrates an example methodology for using a proxy object to proxy an operation called by third party code.

With reference now to FIGS. 8-10, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 8, an example methodology 800 for detouring in a scripting system is illustrated. The methodology 800 starts at 802, and at 804 third party code that is desirably executed in a host environment is received. For instance, the host environment can execute a dynamic programming language such as javascript.

At 806, prior to executing the third party code, an object reference used by the third party code can be replaced with a proxy object. At 808, the third party code can be executed such that the third party code calls the proxy object. The methodology 800 completes at 810.

Turning now to FIG. 9, an example methodology 900 for proxying a DOM operation is illustrated. The methodology 900 starts at 902, and at 904, third party code is received for execution in a host environment. For instance, the third party code can correspond to a dynamic programming language, wherein the third party code has at least one object reference to a first object that is used by the third party code.

At 906, a proxy object is created, wherein the proxy object can be created based at least in part upon the received third party code. At 908, at least one object reference in the third party code is replaced with the proxy object, such that the third party code at runtime calls the proxy object. At 910, an operation corresponding to a first object in the third party code is proxied. The methodology 900 completes at 912.

Now turning to FIG. 10, an example methodology 1000 for detouring a request for a DOM operation is illustrated. The methodology 1000 starts at 1002, and at 1004 third party code is called in a web browser, wherein the third party code is to be executed in a web page as an advertisement. In an example, the third party code can be javascript code.

At 1006, a proxy object is created in a javascript execution environment, wherein the proxy object is a proxy to a document object model object referenced in the third party code. At 1008, the document object model object referenced in the third party code is replaced with the proxy object.

At 1010, the third party code is executed in an iframe. At 1012, a document object model operation is proxied through use of the proxy object. The methodology 1000 completes at 1014.

Figure 11:
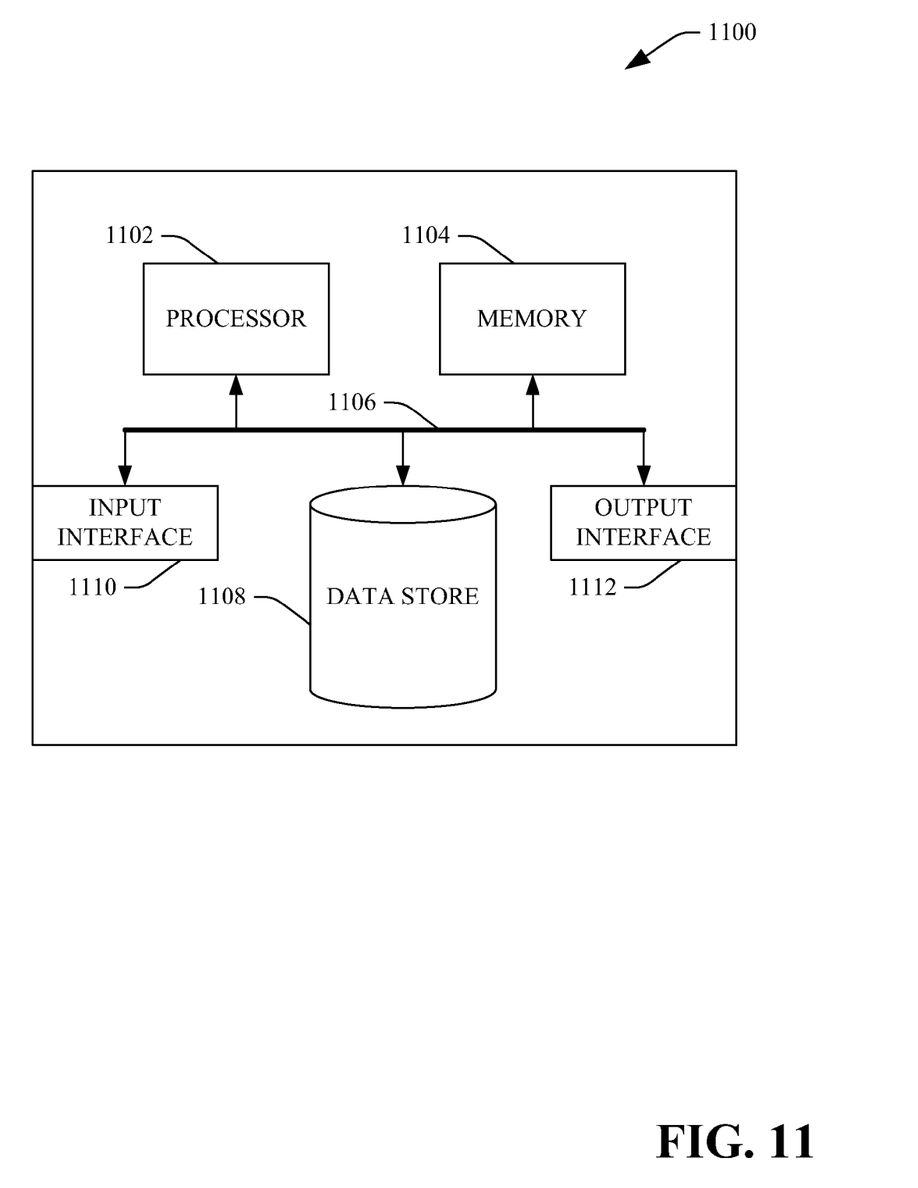
FIG. 11 is an example computing system.

Now referring to FIG. 11, a high-level illustration of an example computing device 1100 that can be used in accordance with the systems and methodologies disclosed herein is illustrated. For instance, the computing device 1100 may be employed in a system that can be used to display web pages, advertisements on web pages, and the like. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store DOM objects, proxy objects, advertising data, etc.

The computing device 1100 additionally includes a data store 1108 that is accessible by the processor 1102 by way of the system bus 1106. The data store 1108 may include executable instructions, advertising data, proxy objects, etc. The computing device 1100 also includes an input interface 1110 that allows external devices to communicate with the computing device 1100. For instance, the input interface 1110 may be used to receive instructions from an external computer device, receive third party code, etc. The computing device 1100 also includes an output interface 1112 that interfaces the computing device 1100 with one or more external devices. For example, the computing device 1100 may transmit data to a personal computer by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   in a web browser, receiving an advertisement that is desirably displayed in the web browser, the advertisement comprising computer-executable code that is written in a dynamic programming language, the computer-executable code comprising a reference to an object, the object being a document object model object;
   prior to executing the computer-executable code in the web browser, replacing the reference to the object with a reference to a proxy object; and
   subsequent to replacing the reference to the object with the reference to the proxy object, executing the computer-executable code such that the computer-executable code calls the proxy object rather than the object.

2. The method of claim 1, wherein the computer-executable code comprises a plurality of references to a respective plurality of objects, and further comprising replacing the plurality of references to the respective plurality of objects with a plurality of references to a respective plurality of proxy objects.

3. The method of claim 2, wherein the plurality of objects are document object model objects.

4. The method of claim 1, wherein the dynamic programming language is javascript.

5. The method of claim 1, wherein the proxy object facilitates restricting access to a portion of a web page to the computer-executable code.

6. The method of claim 1, further comprising using the proxy object to migrate an advertisement from a same domain iframe to a soft-cross-domain iframe.

7. The method of claim 1, further comprising rendering the advertisement on a web page.

8. The method of claim 1, wherein the advertisement is an interactive advertisement.

9. The method of claim 1, wherein the advertisement is desirably displayed in the web browser together with at least one email of a user.

10. The method of claim 1, wherein the proxy object restricts an amount of time that the advertisement is displayed in the web browser.

11. A system comprising the following computer executable components:
- a processor; and
- a memory that comprises a plurality of components that are executed by the processor, the plurality of components comprising:
  - a receiver component that receives an advertisement for display on a web page, the advertisement comprising third party code for execution in a web browser, wherein the third party code is written in a dynamic programming language, wherein the third party code has at least one object reference to a first object that is used by the third party code, the first object being a document object model object; and
  - a detouring component that automatically replaces the first object referenced by the third party code with a proxy object such that the third party code at runtime calls the proxy object instead of the first object.

12. The system of claim 11, wherein the advertisement is an interactive advertisement.

13. The system of claim 11, wherein the detouring component comprises:
- a creator component that creates the proxy object; and
- a replacer component that replaces the at least one object reference with the created proxy object.

14. The system of claim 11, wherein the plurality of components further comprises a render component that renders the advertisement in the web browser based at least in part upon the received third party code.

15. The system of claim 11, wherein the detouring component creates a plurality of proxy objects corresponding to a plurality of objects referenced by the third party code.

16. The system of claim 11, wherein the dynamic programming language is javascript.

17. The system of claim 11, wherein the proxy object facilitates restricting access to a portion of the web page to the third party code.

18. A computer readable data storage device comprising instructions that, when executed by a computer, perform the following acts:
- in a web browser, calling in third party code that is to be executed in a web page as an advertisement, wherein the third party code is javascript code;
- creating a proxy object in a java execution environment, wherein the proxy object is a proxy to a document object model object referenced in the third party code;
- replacing the document object model object referenced in the third party code with the proxy object;
- executing the third party code in an iframe; and
- proxying a document object model operation through use of the proxy object.

\* \* \* \* \*